United States Patent [19]
Jirgal et al.

[11] Patent Number: 5,793,990
[45] Date of Patent: Aug. 11, 1998

[54] MULTIPLEX ADDRESS/DATA BUS WITH MULTIPLEX SYSTEM CONTROLLER AND METHOD THEREFOR

[75] Inventors: James J. Jirgal, Mesa; David R. Evoy, Tempe; Walter H. Potts, Phoenix, all of Ariz.

[73] Assignee: VLSI Technology, Inc., San Jose, Calif.

[21] Appl. No.: 76,876

[22] Filed: Jun. 11, 1993

[51] Int. Cl.$^6$ ..................................................... G06F 3/00
[52] U.S. Cl. .......................................................... 395/287
[58] Field of Search ..................................... 395/325, 281, 395/297, 304, 306, 307, 287

[56] References Cited

U.S. PATENT DOCUMENTS

| | | | |
|---|---|---|---|
| 4,112,490 | 9/1978 | Pohlman et al. | 395/325 |
| 4,286,321 | 8/1981 | Baker et al. | 395/325 |
| 4,403,283 | 9/1983 | Myntti et al. | 395/425 |
| 4,675,808 | 6/1987 | Grinn et al. | 395/400 |
| 4,860,198 | 8/1989 | Takenaka | 395/325 |
| 4,987,529 | 1/1991 | Cratt et al. | 395/325 |
| 5,214,767 | 5/1993 | Wanner et al. | 395/425 |

Primary Examiner—Ayaz R. Sheikh
Assistant Examiner—P. R. Myers
Attorney, Agent, or Firm—Harry M. Weiss; Jeffrey D. Moy; Harry M. Weiss & Associates, P.C.

[57] ABSTRACT

A computer system having a multiplex address/data bus with a multiplex system controller and method therefor is disclosed which provides in a computer system having time shared use of a multiplex address/data bus to reduce the number of required pins for devices within the computer system, a CPU having at least one address bus, at least one data bus, at least one memory input/output, and at least one CPU control bus coupled thereto for sending and receiving information. In addition, this system includes at least one memory input/output device coupled to a first portion of the address bus for sending and receiving at least one of address information and data information, at least one input/output only device coupled to a second portion of the address bus for sending and receiving at least one of address information and data information, and a multiplex system controller coupled to the CPU and the address bus and having a multiplex control bus coupled to both the memory input/output device and to the input/output only device for taking control of the address bus from the CPU.

15 Claims, 9 Drawing Sheets

TABLE 1
MEMORY/IO DEVICE 16-BIT ADDRESS/DATA FORMAT

| CPU ADDR. LINE | A25 | A24 | A23 | A22 | A21 | A20 | A19 | A18 | A17 | A16 | A15 | A14 | A13 | A12 | A11 | A10 |
|---|---|---|---|---|---|---|---|---|---|---|---|---|---|---|---|---|
| FIRST ADDR. | A25 | A24 | A23 | A22 | A21 | A20 | A19 | A18 | A17 | A16 | A15 | A14 | A13 | A12 | A11 | A10 |
| SECOND ADDR. | A9 | A8 | A7 | A6 | A5 | A4 | A3 | A2 | W/R# | A1 | BHE# | BLE# | R | D/C# | R | 1 |
| FIRST DATA | D15 | D14 | D13 | D12 | D11 | D10 | D9 | D8 | D7 | D6 | D5 | D4 | D3 | D2 | D1 | D0 |

TABLE 2
I/O DEVICE 16-BIT ADDRESS/DATA FORMAT

| CPU ADDR. LINE | A9 | A8 | A7 | A6 | A5 | A4 | A3 | A2 | A17 | A16 | A15 | A14 | A13 | A12 | A11 | A10 |
|---|---|---|---|---|---|---|---|---|---|---|---|---|---|---|---|---|
| FIRST ADDR. | A9 | A8 | A7 | A6 | A5 | A4 | A3 | A2 | A17 | A16 | A15 | A14 | A13 | A12 | A11 | A10 |
| SECOND ADDR. | A25 | A24 | A23 | A22 | A21 | A20 | A19 | A18 | W/R# | A1 | BHE# | BLE# | R | D/C# | R | 1 |
| FIRST DATA | D15 | D14 | D13 | D12 | D11 | D10 | D9 | D8 | D7 | D6 | D5 | D4 | D3 | D2 | D1 | D0 |

MULTIPLEX ADDRESS/DATA BUS WITH MULTIPLEX SYSTEM CONTROLLER AND METHOD THEREFOR

FIELD OF THE INVENTION

This invention relates generally to computer systems and, more specifically, to a computer system having a multiplex address/data bus with a multiplex system controller and method therefor which provides unique arrangements of at least a CPU, a memory input/output device, an input/output only device, and a multiplex system controller such that the multiplex system controller tri-states or time shares the CPU's address bus in order to sequentially transfer groups of at least address and data information to the memory input/output devices and the input/output only devices in a manner that allows a substantial reduction in the number of required pins for the memory input/output devices and the input/output only devices.

DESCRIPTION OF THE PRIOR ART

A general trend in computer system design has been to reduce the size of electronic devices while maintaining or increasing the number of pieces of information that these devices can process. In keeping with this trend, smaller computer systems such as laptop and hand held computer systems are entering the marketplace. One problem associated with these systems is that they oftentimes use relatively large devices that come from their larger desktop computer predecessors. More specifically, these large sized devices, such as memo input/output devices and input/output only devices, require a large number of address and data pins to send and receive address and data information. The Intel Peripheral Component Interconnect (PCI) system provides a central processing unit connected to a PCI controller via address and data buses. The PCI controller provides a control bus and a combined address/data bus to communicate with memory input/output devices and input/output only devices. This combined address/data bus provides address and data information in 32 bit quantities, consequently, each of the input/output and input/output only devices require 32 pins to correspond to the 32 bit address/data bus. In an effort to further reduce the size of these devices and the size of the computer systems in which they operate, a need existed to reduce the number of pins required by these devices while still providing 32 bit address/data information. Therefore, a need existed to develop a system that time shares or multiplex a host CPU's 32 bit address bus in order to transfer address and data information over a portion of the CPU address bus. This innovative system monitors CPU cycles on the CPU address bus and, at the appropriate time, tri-states the CPU address bus in order to transmit address and data information over a smaller portion of the CPU address bus to the input/output and input/output only devices, thereby reducing the number of required pins for these devices as well as the size of these devices.

SUMMARY OF THE INVENTION

In accordance with one embodiment of this invention, it is an object of this invention to provide a computer system having a multiplex address/data bus with a multiplex system controller and method therefor.

It is another object of this invention to provide a computer system having a multiplex address/data bus with a multiplex system controller which time shares a CPU's address bus with the CPU.

It is a further object of this invention to provide a computer system having a multiplex address/data bus with a multiplex system controller that communicates with devices within the computer system in a manner that reduces the number of required pins for these devices.

It is yet another object of this invention to provide a computer system having a multiplex address/data bus with a multiplex system controller that supports communication with ISA devices.

It is a further object of this invention to provide a computer system having a multiplex address/data bus with a multiplex system controller that supports DMA communication cycles.

BRIEF DESCRIPTION OF THE PREFERRED EMBODIMENTS

In accordance with one embodiment of this invention, a computer system having time shared use of buses to reduce the number of required pins for devices within the computer system is disclosed comprising, in combination, Central Processing Unit (CPU) means having at least one address bus, at least one data bus, at least one memory input/output, and at least one CPU control bus coupled thereto for sending and receiving information, at least one memory input/output means coupled to a first portion of the address bus for sending and receiving at least one of address information and data information, at least one input/output only means coupled to a second portion of the address bus for sending and receiving at least one of address information and data information, and multiplex system controller means coupled to the CPU means and to the address bus and having multiplex control bus means coupled to both the memory input/output means and to the input/output only means for taking control of the address bus from the CPU means. The multiplex system controller means comprises, in combination, state machine means coupled to the multiplex control bus means and to the CPU control bus for controlling the multiplex system controller means, address latch means coupled to the state machine means and to the address bus for temporarily storing address information, and a plurality of multiplexer means each coupled to the address latch means, the data bus, the state machine means, and to a Direct Memory Access (DMA) controller for transferring data to the data bus and to the address bus in response to control signals from the state machine means. In addition, the state machine means is provided with priority signal means for interrupting a multiplex bus cycle.

In accordance with another embodiment of this invention, a method of providing a computer system having time shared use of buses to reduce the number of required pins for devices within the computer system is provided comprising the steps of providing Central Processing Unit (CPU) means having at least one address bus, at least one data bus, at least one memory input/output, and at least one CPU control bus coupled thereto for sending and receiving information, providing at least one memory input/output means coupled to a first portion of the address bus for sending and receiving at least one of address information and data information, providing at least one input/output only means coupled to a second portion of the address bus for sending and receiving at least one of address information and data information, and providing multiplex system controller means coupled to the CPU means and to the address bus and having multiplex control bus means coupled to both the memory input/output means and to the input/output only means for taking control of the address bus from the CPU means. In addition, providing the multiplex system controller means comprises the steps of providing state machine means coupled to the multiplex control bus means and to the CPU control bus for controlling the multiplex system controller means, providing address latch means coupled to the state machine means and to the address bus for temporarily storing address information, and providing a plurality of multiplexer means each coupled to the address latch means, the data bus, the state machine means, and to a Direct Memory Access (DMA) controller for transferring data to the data bus and to the address bus in response to control signals from the state machine means. Also, the state machine means is provided with priority signal means for interrupting a multiplex bus cycle.

In accordance with yet another embodiment of this invention, a computer system having time shared use of buses to reduce the number of required pins for devices within the computer system is disclosed comprising, in combination, CPU means located on a CPU bus controller chip and having at least one CPU control bus, at least one address bus, and at least one data bus for sending and receiving information, multiplex system controller means residing in the chip and coupled to each of the CPU control bus, the address bus, and the data bus for communicating with the CPU means, CPU bus slave means coupling each of the CPU control bus, the address bus, and the data bus to the multiplex system controller means for coordinating data flow on each of the CPU control bus, the address bus, and the data bus, at least one memory input/output means coupled to a first portion of the address bus for sending and receiving at least one of address and data information, and at least one input/output only means coupled to a second portion of the address bus for sending and receiving at least one of address and data information. In addition, the multiplex system controller means has multiplex control bus means coupled to both the memory input/output means and the input/output only means for taking control of the address bus. The multiplex system controller means comprises, in combination, state machine means coupled to the multiplex control bus means and to the CPU control bus for controlling the multiplex system controller means, address latch means coupled to the state machine means and to the address bus for temporarily storing address information, and a plurality of multiplexer means each coupled to the address latch means, the data bus, and to the state machine means for transferring data to the data bus and to the address bus in response to control signals from the state machine means. Also, the state machine means is provided with priority signal means for interrupting a multiplex bus cycle.

In accordance with a further embodiment of this invention, a method of providing a computer system having time shared use of buses to reduce the number of required pins for devices within the computer system is provided comprising the steps of providing CPU means located on a CPU bus controller chip and having at least one CPU control bus, at least one address bus, and at least one data bus for sending and receiving information, providing multiplex system controller means residing in the chip and coupled to each of the CPU control bus, the address bus, and the data bus for communicating with the CPU means, providing CPU bus slave means coupling each of the CPU control bus, the address bus, and the data bus to the multiplex system controller means for coordinating data flow on each of the CPU control bus, the address bus, and the data bus, providing at least one memory input/output means coupled to a first portion of the address bus for sending and receiving at least one of address and data information, and providing at least one input/output only means coupled to a second portion of the address bus for sending and receiving at least one of address and data information. The multiplex system controller means has multiplex control bus means coupled to both the memory input/output means and the input/output only means for taking control of the address bus. The method of providing the multiplex system controller means comprises the steps of providing state machine means coupled to the multiplex control bus means and to the CPU control bus for controlling the multiplex system controller means, providing address latch means coupled to the state machine means and to the address bus for temporarily storing address information, and providing a plurality of multiplexer means each coupled to the address latch means, the data bus, and to the state machine means for transferring data to the data bus and to the address bus in response to control signals from the state machine means. In addition, the state machine means is provided with priority signal means for interrupting a multiplex bus cycle.

The forgoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 4 is a model demonstrating the use of portions of the address formats shown in FIGS. 3A and 3B for selecting byte locations for data.

DESCRIPTION OF THE PREFERRED EMBODIMENT

Figure 1:
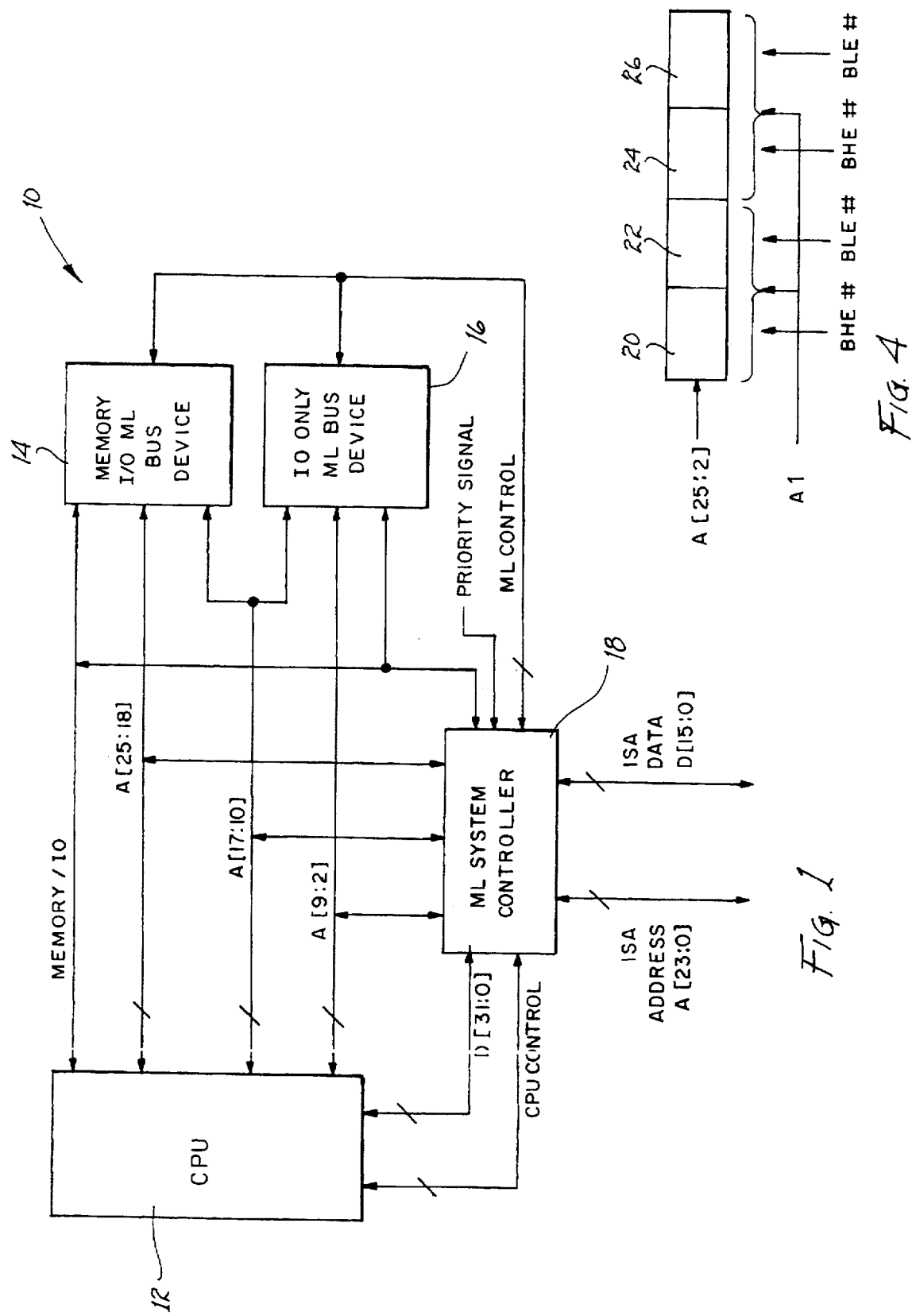
FIG. 1 is a simplified block diagram of a local bus architecture embodiment of the computer system having the multiplex address/data bus with a multiplex system controller.

Referring to FIG. 1, a computer system having the multiplex address/data bus with a multiplex system controller is shown and is generally designated by reference number 10, and for future reference, this system will be referred to as a multiplex system 10. In this particular embodiment of the multiplex system 10, a local bus architecture is depicted. The Central Processing Unit (CPU) 12 is provided with a memory input/output (I/O) signal line, an address bus A[25:2] broken into groups A[25:18], A[17:10], and A[9:2], a data bus D[31:0], and a CPU control bus. A single memory I/O multiplex bus device 14 and a single I/O only multiplex bus device 16 is shown for simplicity, however, several of each of these devices 14 and 16 may be implemented. Note that the memory I/O multiplex bus device 14 has both memory and I/O space whereas the I/O only multiplex bus device 16 has I/O space only. The multiplex system controller 18 in addition to the memory I/O device 14, the I/O only device 16, and the CPU 12 are coupled to the memory I/O signal line. The CPU 12 and the multiplex system controller 18 are also coupled via the CPU control bus, the data bus D[31:0], and the address bus A[25:2]. The multiplex system controller 18 is coupled to the memory I/O device 14 and the I/O only device 16 via the multiplex control bus. In addition, the multiplex system controller 18 is provided with an Industry Standard Architecture (ISA) address bus A[23:0], an ISA data bus D[15:0], and a priority signal line. The memory I/O device 14 is coupled to both the CPU 12 and the multiplex system controller 18 via a first portion of the address bus A[25:18] and A[17:10], and the I/O only device 16 is coupled to both the CPU 12 and the multiplex system controller 18 via a second portion of the address bus A[17:10] and A[9:2].

Figure 2:
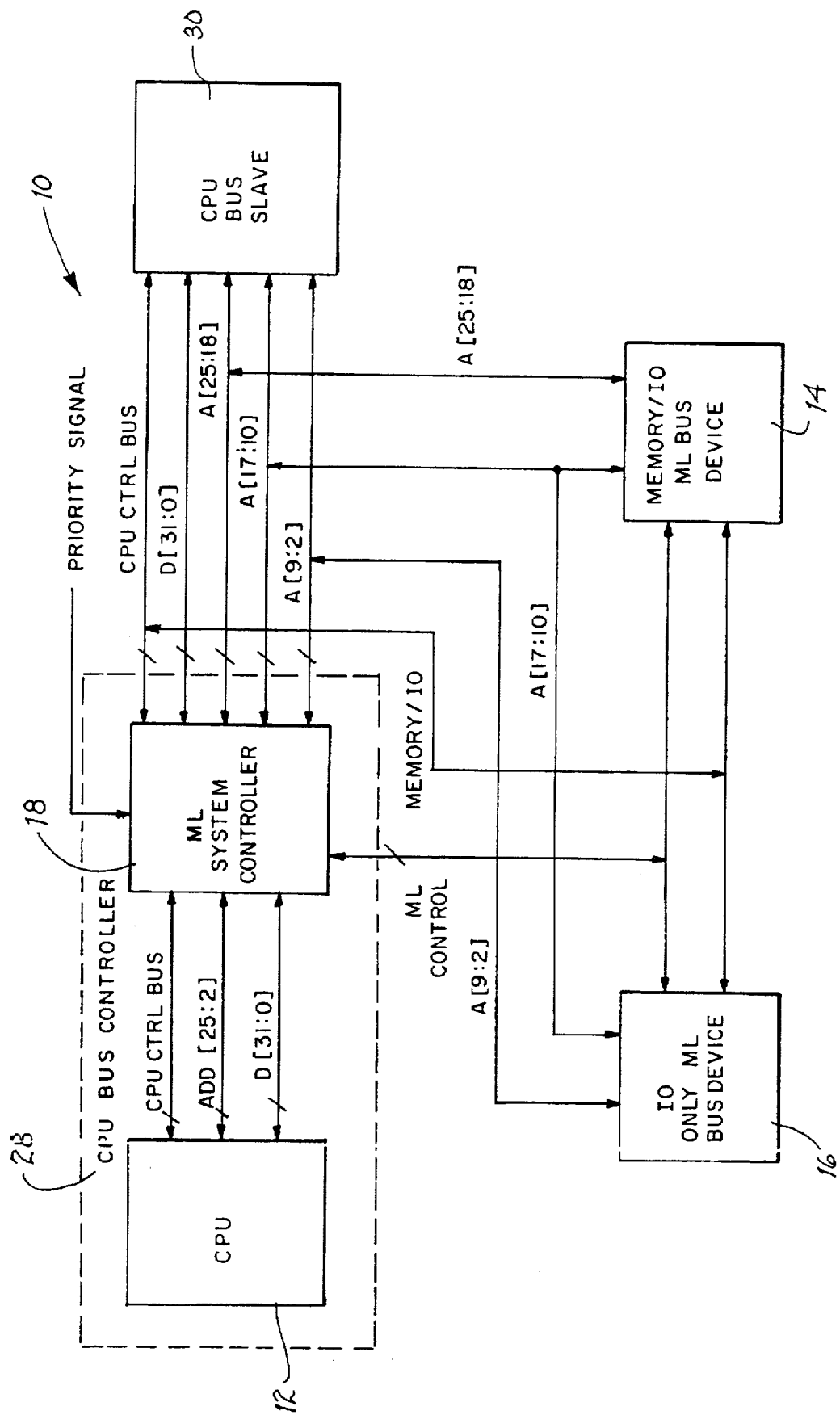
FIG. 2 is a simplified block diagram of a downstream architecture embodiment of the computer system having the multiplex address/data bus with a multiplex system controller.

Referring to FIG. 2, the multiplex system 10 is depicted in a downstream architecture layout. A CPU bus controller 28 contains both the CPU 12 and the multiplex system controller 18. The CPU control bus, address bus A[25:2], and the data bus D[31:0] couple the CPU 12 to the multiplex system controller 18. The CPU control bus, address bus A[25:2], and the data bus D[31:0] extend outside the CPU bus controller 28 from the multiplex system controller 18, and these buses are continuous through the multiplex system controller 18. A priority signal line is provided for the multiplex system controller 18, and the controller 18 is coupled to a CPU bus slave 30 via the CPU control bus, the address bus A[25:2], and the data bus. A memory I/O signal from the CPU control bus runs to each of the I/O only device 16 and the memory I/O device 14. Also, the multiplex system controller 18 has a multiplex control bus coupled to each of the I/O only device 16 and the memory I/O device 14. The memory I/O device 14 is coupled to both the CPU bus slave 30 and the multiplex system controller 18 via a first portion of the address bus A[25:18] and A[17:10], and the I/O only device 16 is coupled to both the CPU bus slave 30 and the multiplex system controller 18 via a second portion of the address bus A[17:10] and A[9:2].

Figures 3A, 3B, 5:
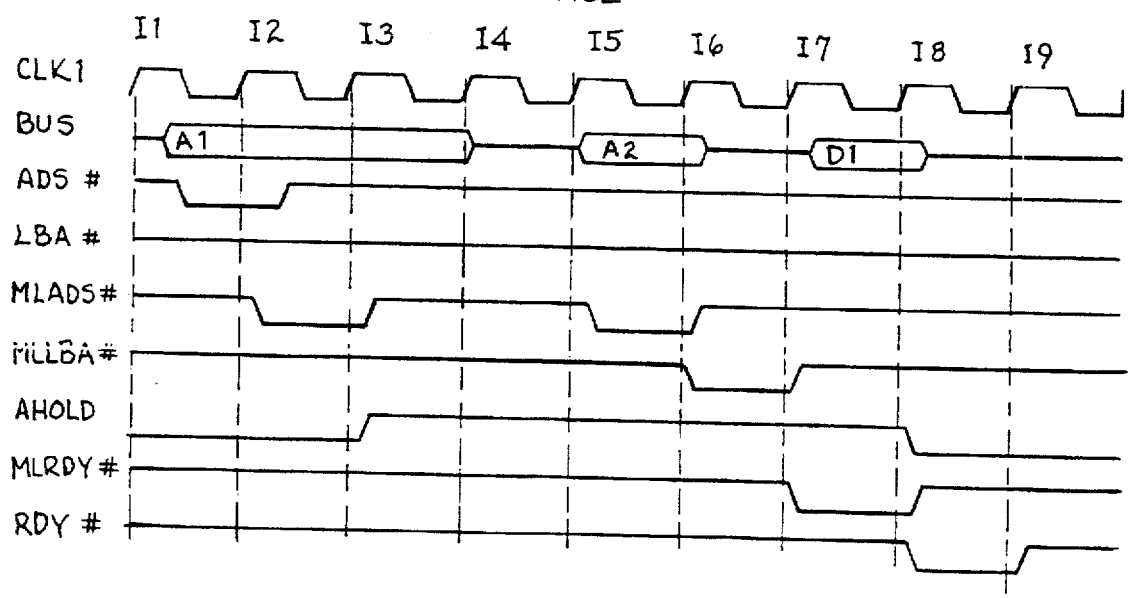
FIG. 3A is table 1 which shows the 16-bit address/data format used by the multiplex address/data bus and multiplex system controller for communicating with memory input/output devices.
FIG. 3B is table 2 which shows the 16-bit address/data format used by the multiplex address/data bus and multiplex system controller for communicating with input/output only devices.
FIG. 5 is a timing diagram showing an input/output read cycle from a high device.

Referring to table 1 of FIG. 3A, the 16-bit address/data format for memory I/O devices 14 is shown. The CPU address line row shows address lines A25–A10 which correspond to one portion A[25:18] and A[17:10] of the address bus A[25:2]. As seen in FIGS. 1 and 2, this portion A[25:18] and A[17:10] of the address bus A[25:2] is connected to the memory I/O device 14. During a multiplex bus cycle, a memory I/O device 14 is sent a first group of 16 address bits, a second group of 16 address bits, and a third group of 16 data bits, which correspond respectively with the first address row, the second address row, and the first data row of FIG. 3A. Note that memory I/O devices such as 14 receive higher order address lines A25–A10 first for early response to the multiplex system controller 18 because in typical system protocol, these devices 14 are located at higher address positions. Also, not that memory I/O devices such as 14 can accept both 16-bit memory and I/O cycles. In addition, since these devices 14 attach to address bus lines A[25:10], they can determine an address bit with 1 Kbyte granularity because A10 corresponds to 2 raised to the tenth power which equals the value 1024. Therefore, the first group of 16 bits A25–A10 determines a specific memory I/O device 14. The second group of 16 bits more particularly defines a location with the data A9–A2. The A2 bit corresponds to 2 raised to the second power, or the value 4, which represents four bytes at a particular location defined by A25–A10 and A9–A2. The bits A1, BHE#, and BLE# are used to point to one or two of these four bytes. The W/R# bit defines either a write or a read situation, and the D/C# bit defines either a data or a code condition. The two "R" bits and the least significant bit are reserved for future use. The first two groups of 16 address bits define either a write cycle or a read cycle of data or code for a one or two byte address location, and the third group of 16 bits D15–D0 define the actual data or code.

Referring to table 2 of FIG. 3B, the 16-bit address/data format for I/O only devices 16 is shown. The CPU address line row shows address lines A9–A2 and A17–A10 which correspond to another portion A[9:2] and A[17:10] of the address bus A[25:2]. As seen in FIGS. 1 and 2, this portion A[9:2] and A[17:10] of the address bus A[25:2] is connected to the I/O only device 16. During a multiplex bus cycle, an I/O only device 16 is sent a first group of 16 address bits, a second group of 16 address bits, and a third group of 16 data bits, which correspond respectively with the first address row, the second address row, and the first data row of FIG. 3B. I/O only devices 16 accept 16-bit I/O cycles only. Having the I/O only device 16 attached to the address lines A[9:2] and A[17:10] is sufficient to decode an Intel X86 CPU's I/O address space to four-byte granularity on the first group of 16 address bits A[9:2] and A[17:10]. This does not allow a full I/O address decode to single byte granularity, however, if the I/O only device 16 corresponds to the full four-byte I/O space indicated by A[9:2] and A[17:10], then the I/O only device 16 can return an early acknowledge signal to accept the current I/O cycle. If the I/O only device 16 provides an early acknowledge, it must still provide an acknowledge in response to the second group of 16 address bits. The first group of 16 address bits A[9:2] and A[17:10] in conjunction with A[25:18] of the second group of 16 bits define a specific four-byte location, and the bits A1, BHE#, and BLE# are used to point to one or two of these four bytes. Note that I/O only device 16 receive the 16 lower order address bits A[9:2] and A[17:10] first because in typical system convention, I/O only devices 16 reside in the lowest 64 Kbytes of addressable space. The W/R# bit defines either a write or a read situation, and the D/C# bit defines either a data or a code condition. The two "R" bits and the least significant bit are reserved for future use. The first two groups of 16 address bits define either a write cycle or a read cycle of data or code for a one or two byte address location, and the third group of 16 bits D15–D0 define the actual data or code.

Referring to FIG. 4, the address lines A[25:2] point to four byte size locations 20, 22, 24, and 26. A portion of the second group of 16 bits, namely A1, BHE#, and BLE#, is used to define one or two of the four bytes 20, 22, 24, and 26. For example, if A1 is logic high, it may point to bytes 20 and 22, and then it would follow that if A1 were logic low, then it points to bytes 24 and 26. Assuming that A1 is logic high, if BHE#, a true low signal, is low then byte 20 is selected. If BLE#, which is also a true low signal, is high, then byte 22 would not be selected. Note that if desired, BHE# and BLE# could be reconfigured to be true high. In either case, one A[25:2] defines the four byte size locations 20, 22, 24, and 26, the signals A1, BHE# and BLE# define one or two bytes from these four bytes. Once the one or two byte address location is defined by the first two groups of 16 bits, the third group of 16 data bits define a corresponding one or two bytes of data. It should also be pointed out that if 32 bits are required, then two sets of the first, second, and third groups of 16 bits are required. In addition, the multiplex address/data bus with the multiplex system controller 10 could be implemented to accommodate other system protocols such as 64 bit protocol, if desired.

Figure 14:
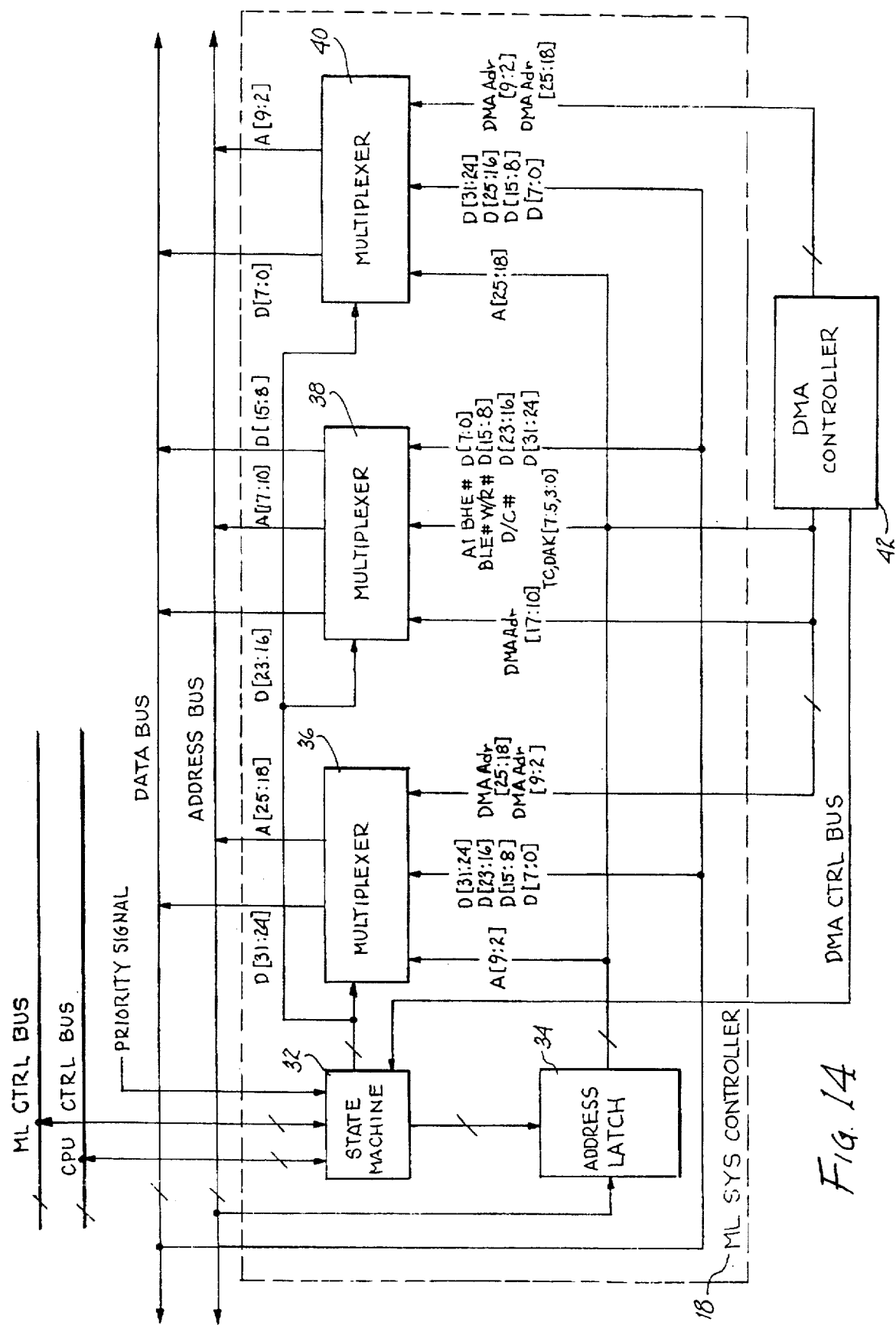
FIG. 14 is a simplified block diagram of the multiplex system controller of FIGS. 1 and 2.

Referring to FIG. 14, the multiplex system controller 18, from FIG. 1 is shown. Note that by disconnecting the Direct Memory Access (DMA) controller 42 and its associated buses from the multiplex system controller 18, the multiplex system controller 18 would function for the multiplex system controller 18 used in FIG. 2. This is the case since the downstream architecture layout of FIG. 2 is not meant for DMA cycle operation. The multiplex system controller 18 has a state machine 32 coupled to both the multiplex control bus and the CPU control bus. In addition, a priority signal line is provided for the state machine 32. The state machine 32 is also coupled to an address latch 34 and to a plurality of multiplexers 36, 38, and 40. The DMA controller 42 provides DA control signals to the state machine 32 via the DMA control bus. The address bus is coupled as an input to the address latch 34. The address latch 34 provides A[9:2] to multiplexer 36, A1, BHE#, BLE#, W/R#, and D/C# to multiplexer 38, and A[25:18] to multiplexer 40. The data bus is coupled to provide D[31:0] to each of the multiplexers 36, 38, and 40. In addition to providing DMA control signals to the state machine 32, the DMA controller 42 provides DMA A[25:18] and DMA A[9:2] to multiplexer 36, TC and DAK[7:5,3:0] signals to multiplexer 38, and DMA A[9:2] and DMA A[25:18] to multiplexer 40. The multiplexer 36 provides D[31:24] to the data bus and A[25:18] to the address bus, and the multiplexer 38 provides D[23:16] and D[15:8] to the data bus and A[17:10] to the address bus. The multiplexer 40 provides D[7:0] to the data bus and A[9:2] to the address bus. Note that the DMA controller 42 has connections to the CPU control bus, the data bus, and the address bus which are not shown for simplification of the diagram.

OPERATION

A computer system having the multiplex address/data bus with the multiplex system controller 18 provides local bus support for pin-limited memory and I/O devices, such as the memory I/O device 14 and the I/O only device 16, that require higher performance than ISA. The multiplex system controller protocol translates CPU memory and I/O cycles into 16-bit multiplex bus cycles in which the address and the data information is passed over the same signal lines, namely a portion A[25:2] of the CPU's 12 typical 32 bit address bus. A computer system can implement the multiplex system 10 if the CPU's address bus is capable of being tri-stated by the multiplex system controller 18 during a CPU memory or CPU I/O cycle.

The following signal descriptions and definitions are provided to facilitate an understanding of the timing diagrams for the multiplex system 10:

ML BUS SIGNALS

MLCLK—MLCLK is the multiplex bus clock. This is a 1X clock driven synchronously to the CPU's clock. A separate clock is provided for multiplex bus devices so that both the CPU's clock and the MLCLK can be independently controlled for power conservation.

MLADS#—MLADS· is the multiplex address strobe. This low true signal indicates when the multiplex system controller 18 is providing valid address or data information on the CPU's address lines.

MLLBA#—MLLBA# is the multiplex device local bus access signal. A multiplex bus device such as the memory I/O device 14 or the I/O only device 16 asserts this low true signal when it positively decodes a valid address transmitted on the CPU's address bus. A memory I/O device 14 must be able to assert the MLLBA# signal in response to the first occurrence of the MLADS# signal if the address presented decodes to its own memory space. The first address group of 16 bits broadcasts enough address bits to decode down to 1 Kbyte granularity, therefore memory space must not be allocated between two different memory devices in blocks smaller than 1 Kbyte. Note that an I/O only device 16 may assert MLLBA# after the first MLADS# assertion if it owns the full four-byte I/O address space indicated by the first group of 16 address bits. If an I/O only device 16 owns part of the four-byte address space specified by the first group of 16 address bits, then it must wait to receive the second group of 16 bits before it can assert MLLBA#. If an I/O only device 16 determines that it owns the byte(s) addressed by the second group of 16 bits, then it must assert MLLBA# in the MLCLK after it samples the second MLADS# assertion. When providing data in an I/O read cycle, a multiplex bus device such as 14 or 16 uses MLLBA# to indicate on which CPU address lines that it is attached. If a device 14 or 16 asserts MLLBA# during an MLRDY# assertion, then the device resides on the CPU address lines A[17:2], and if MLLBA# is negated by a device during an MLRDY# assertion, then the device resides on the CPU address lines A[25:10].

MLRDY#—MLRDY# is the multiplex ready signal. An addressed multiplex bus device such as 14 or 16 asserts MLRDY# to indicate that it has accepted the current write data and that the multiplex system controller 18 can begin presenting new information. A multiplex bus device such as 14 or 16 also asserts MLRDY# to indicate that it is providing valid data in response to a multiplex system controller's 18 read request. The multiplex system controller 18 can also assert MLRDY# to terminate a multiplex bus cycle when it determines that no multiplex bus device such as 14 or 16 has acknowledged a presented address.

CPU AND OTHER SIGNALS

ADS#—ADS# is the CPU's address strobe signal. When ADS# is asserted, it indicates the beginning of a CPU cycle or DMA memory cycle.

M/IO#—M/IO# is the CPU's memory/IO status signal. When M/IO# is sampled high with either ADS# or MLADS# low, this signal indicates that the CPU 12 is addressing memory space. When M/IO# is sampled low with either ADS# or MLADS# low, this signal indicates that the CPU 12 is addressing I/O space.

AHOLD—AHOLD is the address hold signal. The multiplex system controller 18 asserts this signal to tri-state the CPU's address bus. The CPU 12 will tri-state its address bus when it samples AHOLD asserted on a rising edge of a CPU clock cycle.

RDY#—RDY# is the CPU ready signal. For read cycles, the multiplex system controller 18 asserts this signal to indicate to the CPU 12 that the read data is valid and ready to be sampled. For write cycles, the multiplex system controller 18 asserts this signal to indicate to the CPU 12 that the addressed device 14 or 16 has accepted the presented write data. This signal also indicates that a memory device has accepted write data or presented read data in a DMA write or read cycle, respectively.

LBA#—LBA# is the local bus access signal. This signal is asserted by a VL-bus compatible device to indicate that it has positively decoded the address of the current cycle and will either provide data(reads) or accept data(writes). If a VL-bus device positively decodes the presented address, it must assert LBA# in the clock cycle following the ADS# assertion.

IOR#—IOR# is the I/O read signal. This signal is asserted by the DMA controller 42 to indicate that an I/O device is to be read.

IOW#—IOW# is the I/O write signal. This signal is asserted by the DMA controller 42 to indicate that an I/O device is to be written.

MEMR#—MEMR# is the memory read signal. This signal is asserted by the DMA controller 42 to indicate that a memory device is to be read.

MEMW#—MEMW# is the memory write signal. This signal is asserted by the DMA controller 42 to indiate that a memory device is to be written.

IOCHRDY—IOCHRDY is the I/O channel ready signal. This signal is negated by the state machine 32 to signal the DMA controller 42 to delay the current DMA cycle.

Referring to FIG. 5, a timing diagram for an I/O read cycle from a high device is shown. For the following timing diagrams, assume that MLCLK and CPUCLK are the same. Note that a high device corresponds to one located on address bus lines A[25:18] such as a memory I/O device 14. Also note that in order to simplify the explanations of the timing diagrams that follow, a series of clock cycle markers are provided accross the top of each diagram, and therefore, the timing diagram explanations correspond to these markers:

I1: The CPU 12 presents as I/O address A1 on the address bus and asserts ADS# on the CPU control bus to mark the beginning of a CPU access cycle.

I2: The state machine 32 of the multiplex system controller 18 asserts MLADS# on the multiplex control bus synchronously to MLCLK to inform the multiplex bus devices 14 and 16 that a valid address is present on the address bus.

I3: On the next rising edge of MLCLK, the state machine 32 of the multiplex bus controller 18 negates MLADS#. If any devices with higher priority then the multiplex bus devices 14 and 16 acknowledge the presented address, they provide a priority signal to the state machine 32 of the multiplex system controller 18. The multiplex system controller 18 samples the priority signal line with the clock cycle that it negates MLADS#. If the priority signal line indicates that a higher priority device has acknowledge the cycle, then the state machine 32 of the multiplex system controller 18 would assert MLRDY# with the same MLCLK to indicate a multiplex bus cycle termination. A multiplex bus cycle termination will be shown in FIGS. 8 and 11. If no higher priority exists, then the multiplex system controller 18 takes possession of the address bus to continue with the multiplex bus cycle. If the multiplex system controller 18 resides on a 486 type CPU 12 address bus, then its state machine 32 will asert AHOLD on the CPU control bus to tri-state the address bus.

I4: The CPU 12 samples the AHOLD signal and tri-states its address bus.

I5: Note that when the CPU 12 first presents an address at I1, the multiplex bus devices 14 and 16 begin decoding the address. On the next MLCLK I5, the state machine 32 asserts MLADS# to signal to the multiplex devices 14 and 16 that the address latch 34 has provided the second valid group of 16 bits A2 to the address bus via the multiplexers 36, 38, and 40. The address latch 34 is able to send this information because it was temporarily stored therein during the beginning of the multiplex bus cycle.

I6: The state machine 32 negates MLADS# and now that all the devices 14 and 16 have the full address, the I/O device that owns that address asserts MLLBA#.

I7: The state machine 32 samples MLLBA#. If MLLBA# is sampled negated, the sate machine 32 asserts MLRDY# and negates AHOLD to terminate the multiplex bus cycle. If MLLBA# is sampled asserted, then the cycle continues and the third group of 16 bit data D1 is provided.

I8: For read cycles, the multiplex system controller 18 samples MLRDY# until it is sampled asserted. For data steering purposes, an I/O only device 16 will assert MLLBA# when it asserts MLRDY# to indicate that it is returning the read data on the CPU address lines A[17:2]. A memory I/O device 14 will negate MLLBA# when it asserts MLRDY# to indicate that it is returning the read data on CPU address lines A[25:10]. On the MLCLK that the state machine 32 samples MLRDY# asserted, it negates AHOLD to release the CPU's 12 address bus.

I9: The state machine 32 asserts RDY# to return control of the address bus to the CPU 12.

Figure 6:
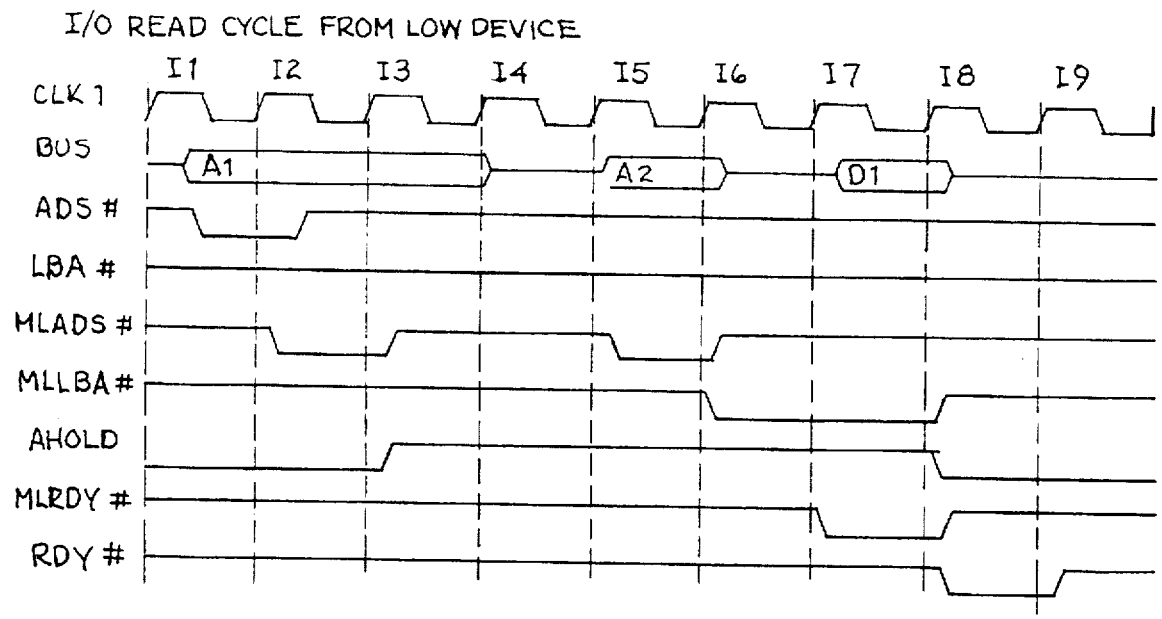
FIG. 6 is a timing diagram showing an input/output read cycle from a low device.

Referring to FIG. 6, a timing diagram for an I/O read cycle from a low device is shown. Note that a low device corresponds to one located on address bus lines A[17:2] such as an I/O only device 16:

I1: The CPU 12 presents an I/O address A1 on the address bus and asserts ADS# on the CPU control bus to mark the beginning of a CPU access cycle.

I2: The state machine 32 of the multiplex system controller 18 asserts MLADS# on the multiplex control bus synchronously to MLCLK to inform the multiplex bus devices 14 and 16 that a valid address is present on the address bus.

I3: On the next rising edge of MLCLK, the state machine 32 of the multiplex bus controller 18 negates MLADS# and asserts AHOLD on the CPU control bus to tri-state the address bus.

I4: The CPU 12 samples the AHOLD signal and tri-states its address bus.

I5: Note that when the CPU 12 first presents an address at I1, the multiplex bus devices 14 and 16 begin decoding the address. On the next MLCLK I5, the state machine 32 asserts MLADS# to signal to the multiplex devices 14 and 16 that the address latch 34 has provided the second valid group of 16 bits A2 to the address bus via the multiplexers 36, 38, and 40.

I6: The state machine 32 negates MLADS# and now that all the devices 14 and 16 have the full address, the I/O device that owns that address asserts MLLBA#.

I7: An I/O only device 16 will assert MLLBA# when it asserts MLRDY# to indiate that it is returning the read data on the CPU address lines A[17:2]. The state machine 32 samples MLLBA# asserted, so the cycle continues and the third group of 16 bit data D1 is provided.

I8: On the MLCLK that the state machine 32 samples MLRDY# asserted, it negates AHOLD to release the CPU's address bus.

I9: The state machine 32 has sampled RDY# to return control of the address bus to the CPU 12.

Figure 7:
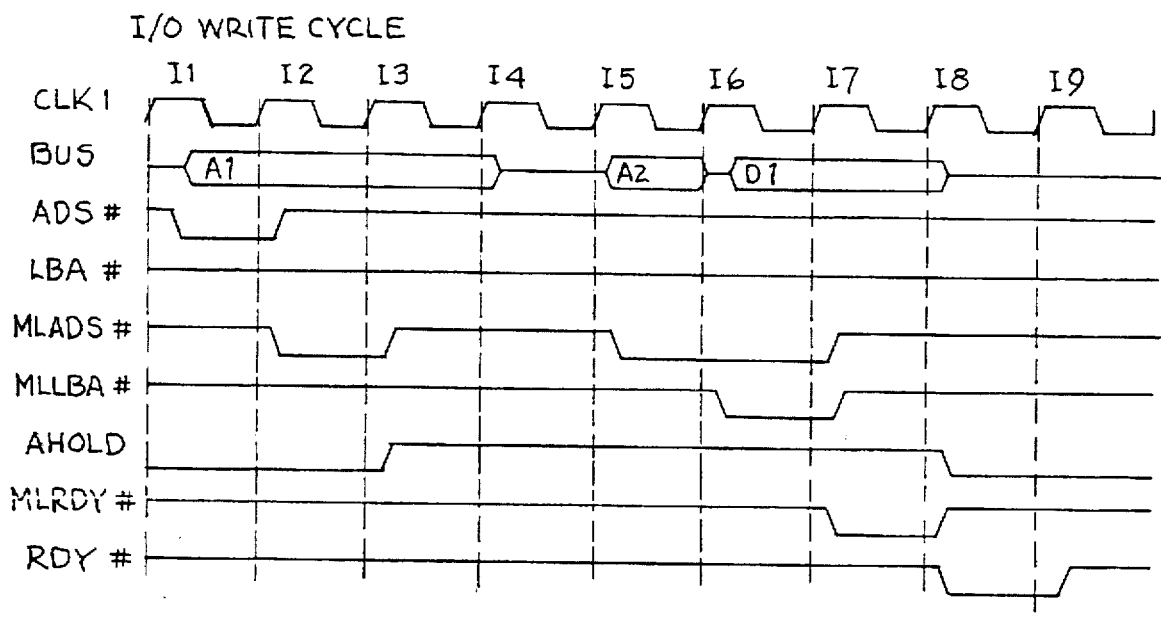
FIG. 7 is a timing diagram showing an input/output write cycle.

Referring to FIG. 7, a timing diagram for an I/O write cycle is shown:

I1: The CPU 12 presents an I/O address A1 on the address bus and asserts ADS# on the CPU control bus to mark the beginning of a CPU access cycle.

I2: The state machine 32 of the multiplex system controller 18 asserts MLADS# on the multiplex control bus synchronously to MLCLK to inform the multiplex bus devices 14 and 16 that a valid address is present on the address bus.

I3: On the next rising edge of MLCLK, the state machine 32 of the multiplex bus controller 18 negates MLADS# and asserts AHOLD on the CPU control bus to tri-state the address bus.

I4: The CPU 12 samples the AHOLD signal and tri-states its address bus.

I5: On the next MLCLK, the state machine 32 asserts MLADS# to signal to the multiplex devices 14 and 16 that the address latch 34 has provided the second valid group of 16 bits A2 to the address bus via the multiplexers 36, 38, and 40.

I6: For write cycles, the multiplex system controller 18 presents the write data from its multiplexers 36, 38, and 40 on the CPU's address lines and asserts MLADS#. The write data remains valid on the CPU's address lines until the state machine 32 samples MLRDY asserted. The I/O device that owns that address asserts MLLBA#.

I7: The state machine 32 samples MLLBA# asserted, so the cycle continues and the third group of 16 bit data D1 is provided.

I8: The state machine 32 samples MLRDY# asserted, and it negates AHOLD to release the CPU's address bus.

I9: The state machine 32 has sampled RDY# to return control of the address bus to the CPU 12.

Figure 8:
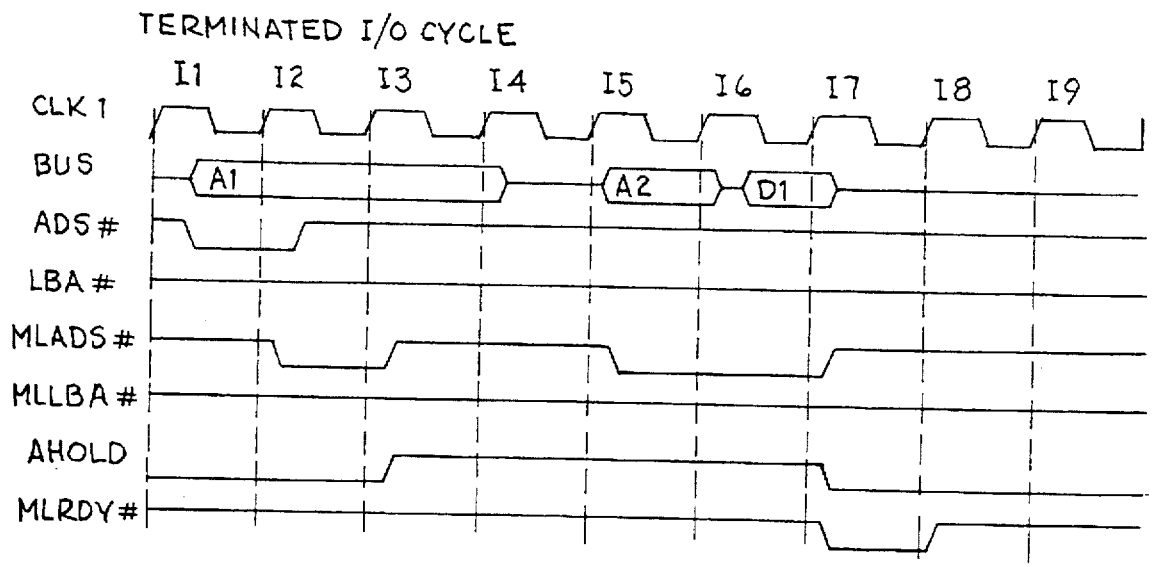
FIG. 8 is a timing diagram showing a terminated input/output cycle.

Referring to FIG. 8, a timing diagram for a terminated I/O cycle is shown:

I1: The CPU 12 presents an I/O address A1 on the address bus and asserts ADS# on the CPU control bus to mark the beginning of a CPU access cycle.

I2: The state machine 32 of the multiplex system controller 18 asserts MLADS# on the multiplex control bus synchronously to MLCLK to inform the multiplex bus devices 14 and 16 that a valid address is present on the address bus.

I3: On the next rising edge of MLCLK, the state machine 32 of the multiplex bus controller 18 negates MLADS# and asserts AHOLD on the CPU control bus to tri-state the address bus.

I4: the CPU 12 samples the AHOLD signal and tri-states its address bus.

I5: On the next MLCLK, the state machine 32 asserts MLADS# to signal to the multiplex devices 14 and 16 that the address latch 34 has provided the second valid group of 16 bits A2 to the address bus via the multiplexers 36, 38, and 40.

I6: For write cycles, the multiplex system controller 18 presents the write data from its multiplexers 36, 38, and 40 on the CPU's address lines and asserts MLADS#. The write data remains valid on the CPU's address lines until the state machine 32 samples MLRDY asserted. The I/O device that owns that address asserts MLLBA#.

I7: The state machine 32 samples the state of MLLBA# to determine if an I/O device has acknowledged the I/O cycle.

Since MLLBA# is negated, no I/O device has successfully acknowledged for A1 and A2, therefore, the state machine 32 terminates the I/O cycle by negating AHOLD and asserting MLRDY#.

I8 and I9: The CPU 12 has regained control of the address bus.

Figure 9:
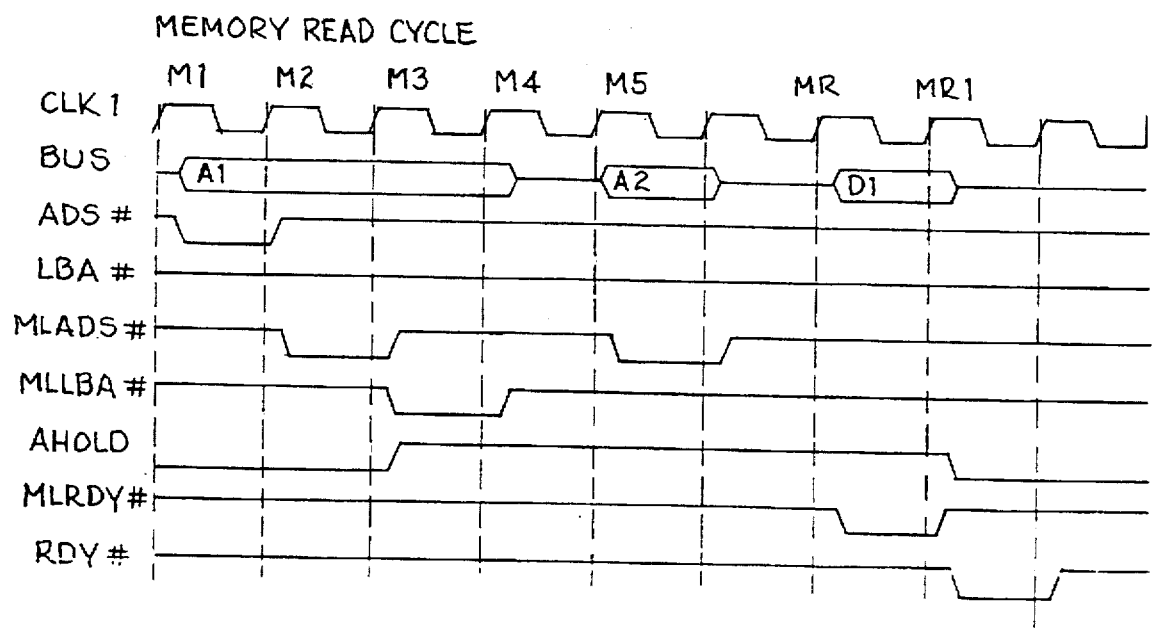
FIG. 9 is a timing diagram showing a memory read cycle.

Referring to FIG. 9, a timing diagram for a memory read cycle is shown:

M1: The CPU 12 presents a memory address A1 on the address bus and asserts ADS# on the CPU control bus to mark the beginning of a CPU access cycle.

M2: The state machine 32 asserts MLADS# to validate the first group of 16 bits A1 and cause the multiplex bus devices 14 and 16 to see if they correspond to this address.

M3: On the next rising edge of MLCLK, the state machine 32 of the multiplex bus controller 18 negates MLADS#. If any devices with higher priority than the multiplex bus devices 14 and 16 acknowledge the presented address, they provide a priority signal to the state machine 32 of the multiplex system controller 18. If the priority signal line indicates that a higher priority device has acknowledged the cycle, then the state machine 32 of the multiplex system controller 18 would assert MLRDY# with the same MLCLK to indicate a multiplex bus cycle termination. If no higher priority exists, then the multiplex system controller 18 takes possession of the address bus to continue with the multiplex bus cycle. If the multiplex system controller 18 resides on a 486 type CPU address bus, then its state machine 32 will assert AHOLD on the CPU control bus to tri-state the address bus.

M4: The state machine 32 samples MLLBA# on the same MLCLK that the CPU 12 samples AHOLD. If MLLBA# was samples negated, the state machine 32 would negate AHOLD and terminate the multiplex bus cycle by asserting MLRDY#.

M5: At the beginning of the CPU cycle, when the CPU 12 first presents an address, the multiplex bus devices 14 and 16 begin decoding the address, however, no multiplex bus device can assert MLLBA# until MLADS# is sampled asserted. If MLLBA# is sampled asserted, then the state machine 32 waits one MLCLK cycle to allow the address bus to tri-state and to drive out the next group of 16 bits. On the rising edge of M5, after MLLBA# was sampled asserted at M4, the address latch 34 presents the second group of 16 bits via the multiplexers 36, 38, and 40. In addition, the state machine 32 asserts MLADS#.

MR: For read cycles, the multiplex system controller 18 is ready to receive read data one MLCLK after it has completed its two groups of 16 address bits. This allows time for the multiplex system controller 18 to release control of CPU's address bus and for the device being read to begin driving the read data D1 back to the multiplex system controller 18. The multiplex bus device asserts MLRDY# with the read data.

MR1: The state machine 32 senses the MLRDY# assertion, asserts RDY#, and negates AHOLD to return control of the address bus to the CPU 12.

Figure 10:
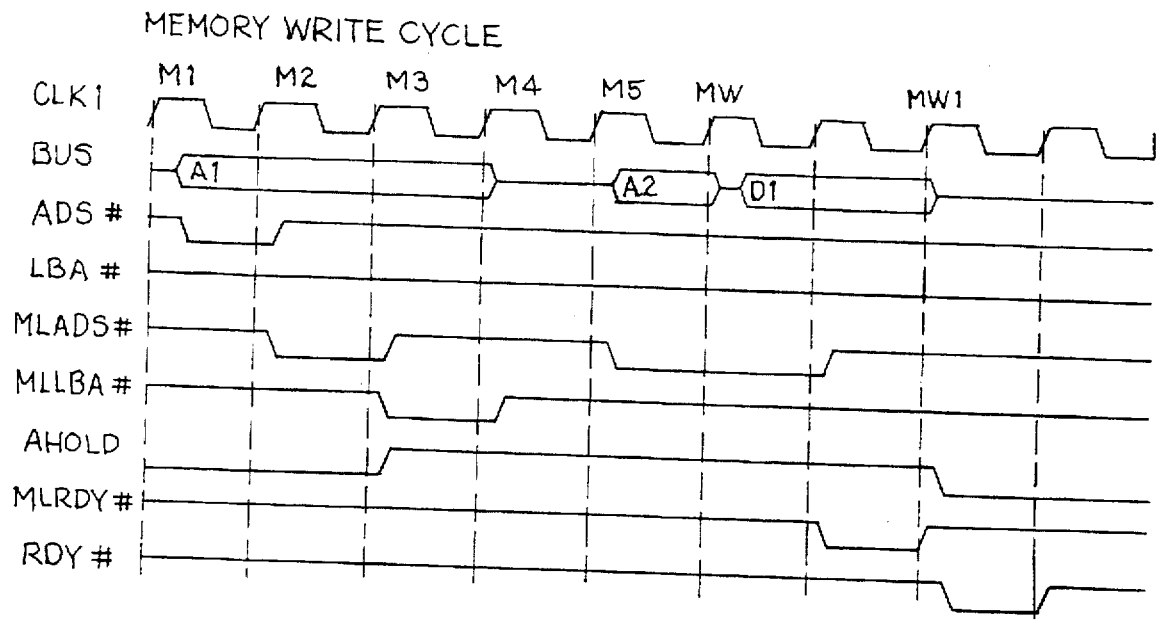
FIG. 10 is a timing diagram showing a memory write cycle.

Referring to FIG. 10, a timing diagram for a memory write cycle is shown:

M1: The CPU 12 presents a memory address A1 on the address bus and asserts ADS# on the CPU control bus to mark the beginning of a CPU access cycle.

M2: The state machine 32 asserts MLADS# to validate the first group of 16 bits A1 and cause the multiplex bus devices 14 and 16 to see if they correspond to this address.

M3: On the next rising edge of MLCLK, the state machine 32 of the multiplex bus controller 18 negates MLADS#, and the state machine 32 asserts AHOLD on the CPU control bus to tri-state the address bus.

M4: The state machine 32 samples MLLBA# on the same MLCLK that the CPU 12 samples AHOLD.

M5: If MLLBA# is sampled asserted, then the multiplex system controller 18 waits one MLCLK cycle to allow the address bus to tri-state and to drive out the next group of 16 bits. On the rising edge of M5, after MLLBA# was sampled asserted at M4, the address latch 34 presents the second group of 16 bits via the multiplexers 36, 38, and 40. In addition, the state machine 32 asserts MLADS#. For write cycles, the multiplex system controller 18, immediately follows the second group of 16 bits with the third group of 16 data bits. This consecutive address-data cycle is signalled by keeping MLADS# asserted for two consecutive MLCLK's.

MW: The third group of 16 data bits is driven out from the multiplexers 36, 38, and 40 to the memory I/O device 14.

MW1: The state machine 32 has sampled the MLRDY# assertion, so it asserts RDY# to the CPU 12 and negates AHOLD to take the address bus out of a tri-state condition.

Figure 11:
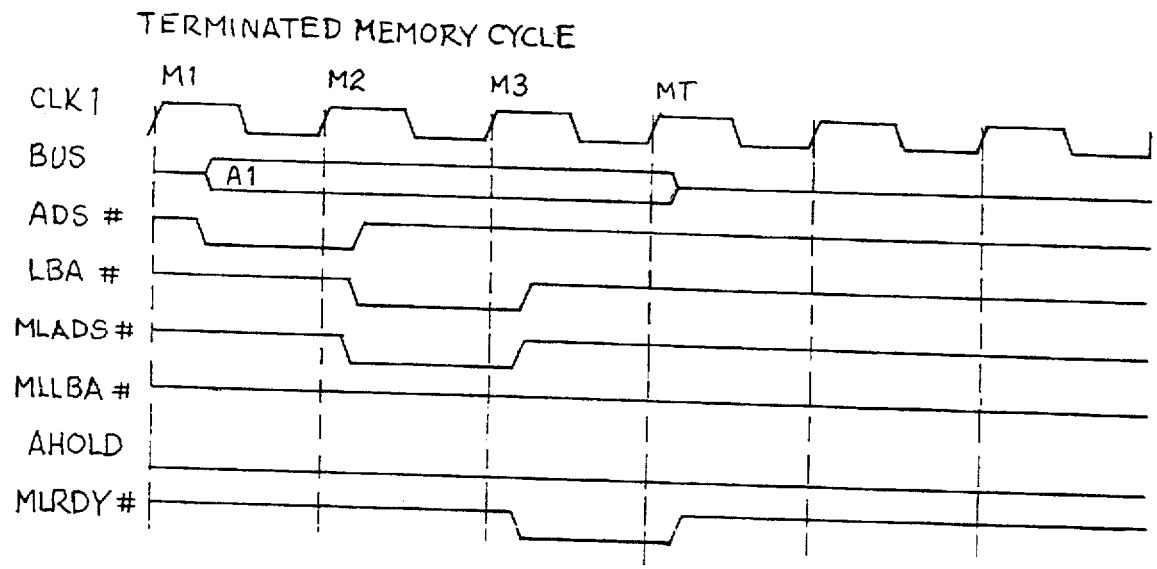
FIG. 11 is a timing diagram showing a terminated memory cycle.

Referring to FIG. 11, a timing diagram for a terminated memory cycle is shown:

M1: The CPU 12 presents a memory address A1 on the address bus and asserts ADS# on the CPU control bus to mark the beginning of a CPU access cycle.

M2: The state machine 32 asserts MLADS# to validate the first group of 16 bits A1 and cause the multiplex bus devices 14 and 16 to see if they correspond to this address.

M3: On the next rising edge of MLCLK, the state machine 32 of the multiplex bus controller 18 negates MLADS#. The asserted LBA# signal indicates a VL-bus device with a higher priority than the multiplex bus devices 14 and 16, therefore a priority signal is provided to the state machine 32 of the multiplex system controller 18. The state machine 32 of the multiplex system controller 18 asserts MLRDY# with the same MLCLK to indicate a multiplex bus cycle termination.

MT: The state machine 32 of the multiplex system controller 18 has asserted MLRDY# to indicate a multiplex bus cycle termination.

Figure 12:
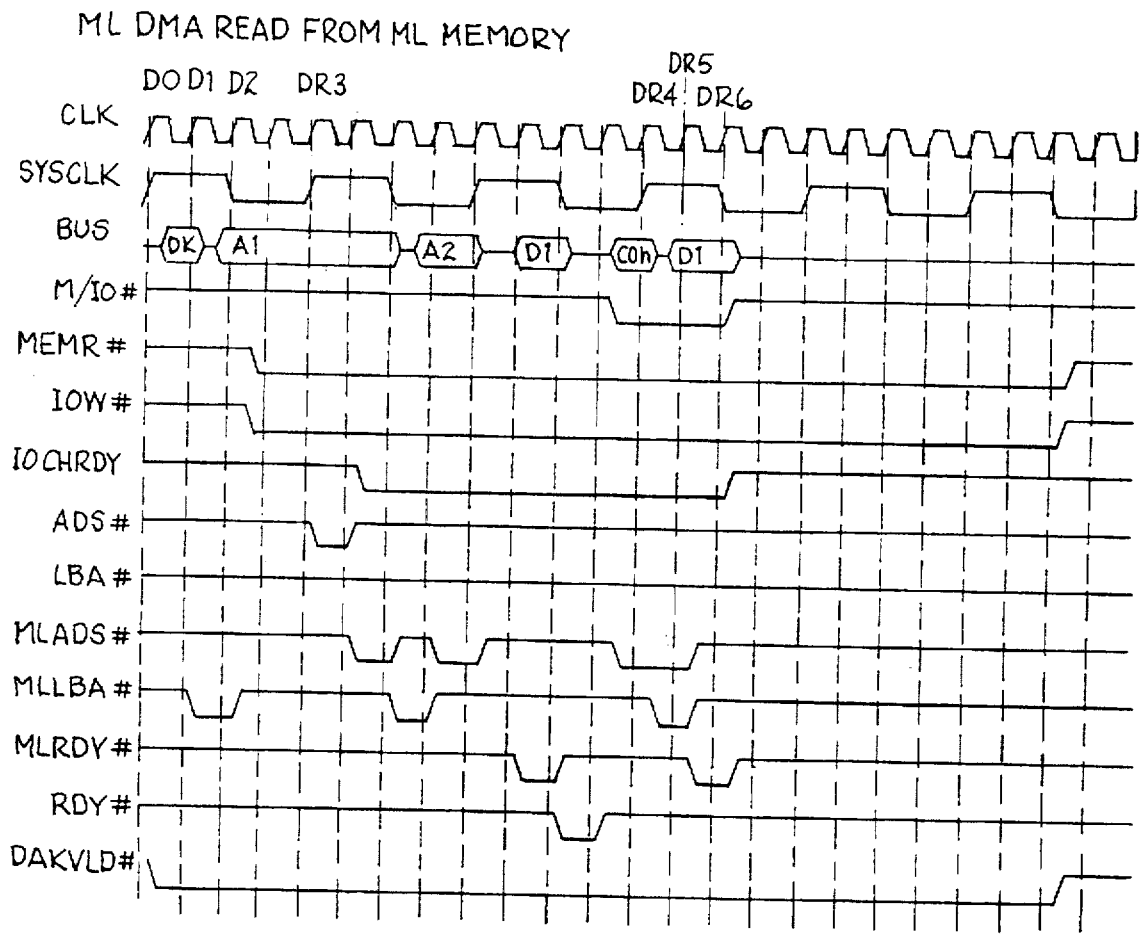
FIG. 12 is a timing diagram showing a multiplex DMA read from multiplex memory.
Figure 13:
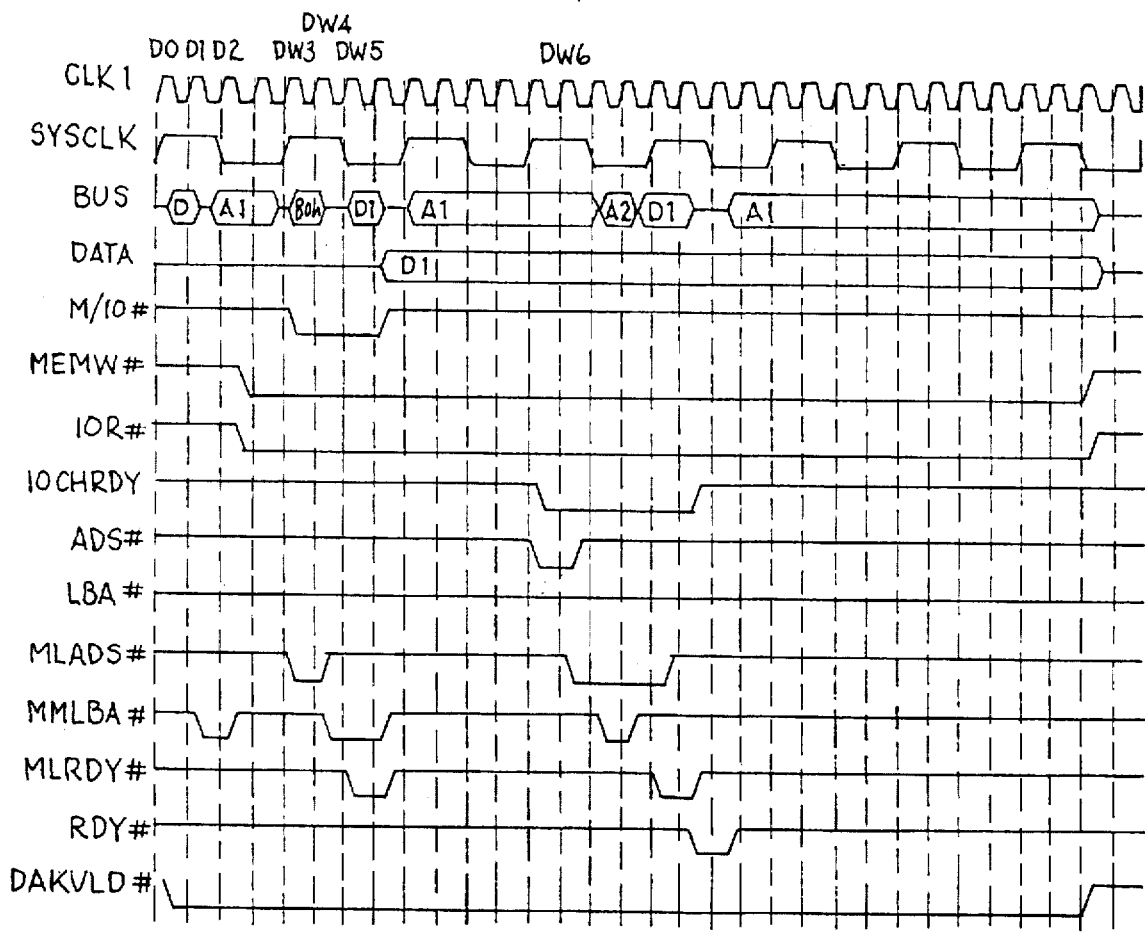
FIG. 13 is a timing diagram showing a multiplex DMA memory access write to multiplex memory.

Referring to FIG. 12, a timing diagram for a multiplex DMA read cycle from a multiplex memory is shown. Note, the SYSCLK signal of FIGS. 12 and 13 represents an ISA clock signal. Such a situation might be domonstrated by a read from a memory I/O device 14 and a write to either the I/O space of a memory I/O device 14 or to an I/O only device 16:

D0: The DMA controller 42 signals the state machine 32 via the DMA control bus that a DMA cycle has been initiated. The state machine 32 responds by asserting DAKVLD# on the multiplex control bus and presenting the state of the DAK signals as presented by the DMA controller 42 via the multiplexer 38.

D1: A memory I/O device 14 or an I/O only device 16 decodes the state of the DAK signals on the address bus and responds by asserting MLLBA#.

D2: The state machine 32 samples the state of MLLBA# as asserted and, therefore determines that a multiplex I/O cycle will follow.

DR3: Upon determining that the DMA cycle is a memory read to I/O write cycle as evident by the assorted states of MEMR# and IOW#, the state machine 32 begins a memory read cycle by asserting ADS# and sending a first group of 16 DMA address bits via the multiplexers 36, 38, and 40.

DR4: Note that between DR3 and DR4, the cycle exhibits a normal multiplex memory read cycle, and, in addition, the state machine 32 negates IOCHRDY or I/O channel ready to delay the DMA controller 42. AFter the memory cycle is complete, the state machine 32 initiates a multiplex I/O write cycle by presenting the I/O address C0h, negating M/IO#, and asserting MLADS#.

DR5: The read data obtained from the memory read cycle is now presented as I/O write data to an I/O device, and MLADS# is asserted by the state machine 32.

DR6: The I/O device responds to indicate that it has successfully received the write data. The state machine 32 asserts IOCHRDY to the DMA controller 42 to complete the DMA cycle.

Referring to FIG. 13, a timing diagram for a multiplex DMA write cycle to a multiplex memory is shown. Such a situation might be demonstrated by a read from the I/O space of an I/O only 16 or memory I/O 14 device and a write to the memory space of a memory I/O device 14:

D0: The DMA controller 42 signals the state machine 32 via the DMA control bus that a DMA cycle has been initiated. The state machine 32 responds by asserting DAKVLD# on the multiplex control bus and presenting the state of the DAK signals as presented by the DMA controller 42 via the multiplexer 38.

D1: A memory I/O device 14 or an I/O only device 16 decodes the state of the DAK signals on the address bus and responds by asserting MLLBA#.

D2: The state machine 32 samples the state of MLLBA# as asserted and, therefore determines that a multiplex I/O cycle will follow.

DW3: Upond etermining that the DMA cycle is an I/O read to memory write cycle as evident by the asserted states of MEMW# and IOR#, the state machine 32 begins an I/O read cycle by presenting the I/O address 80h, negating M/IO#, and asserting MLADS#.

DW4: One MLCLK cycle is allowed for the address bus to tri-state and for the I/O device to take control of the address bus.

DW5: The I/O device presents the I/O read data on the address bus and asserts MLRDY#.

DW6: The I/O cycle is complete. the state machine 32 executes a memory write cycle by asserting ADS#. The cycle continues as a typical multiplex memory write cycle. The DMA cycle ends after the completion of the multiplex memory write cycle.

While the invention has been particularly shown and described with reference to the preferred embodiments thereof, it will be understood by those skilled in the art that the foregoing and other changes in form and details may be made therein without departing from the spirit and scope of the invention.

I claim:

1. In a computer system having timed shared use of buses to reduce the number of required pins for devices within said computer system, comprising, in combination:

Central Processing Unit (CPU) means having at least one address bus, at least one data bus, at least one memory input/output, and at least one CPU control bus coupled thereto for sending and receiving information;

at least one memory input/output means coupled to a first portion of said address bus for sending and receiving at least one of address information and data information;

at least one input/output only means coupled to a second portion of said address bus for sending and receiving at least one of address information and data information; and multiplex system controller means coupled to said CPU means and to said address bus and having multiplex control bus means coupled to both said memory input/output means and to said input/output only means for time sharing said address bus of said CPU means in order to sequentially transfer groups of at least address and data information to said memory input/output means and said input/output only means comprising, in combination:

state machine means coupled to said multiplex control bus means and to said CPU control bus for controlling said multiplex system controller means;

address latch means coupled to said state machine means and to said address bus for temporarily storing address information; and a plurality of multiplexer means each coupled to said address latch means, said data bus, said state machine means, and to a Direct Memory Access (DMA) controller for transferring data to said data bus and to said address bus in response to control signals from said state machine means.

2. The system of claim 1 wherein said state machine means is provided with priority signal means for interrupting a multiplex bus cycle.

3. The system of claim 1 wherein said multiplex system controller means is coupled to at least one Industry Standard Architecture (ISA) address bus and to at least one ISA data bus to provide multiplex bus cycle operation with ISA bus devices.

4. The system of claim 1 wherein said multiplex system controller means is coupled to said DMA controller to execute DMA cycles.

5. The system of claim 1 wherein said multiplex system controller means takes temporary control of said address bus from said CPU means to send a first group of bits comprising address bits, a second group of bits comprising address bits, and a third group of bits comprising data bits to said memory input/output means.

6. The system of claim 5 wherein said multiplex system controller means takes temporary control of said address bus from said CPU means to send a first group of bits comprising address bits, a second group of bits comprising address bits, and a third group of bits comprising data bits to said input/output only means.

7. The system of claim 6 wherein said first group of bits comprising address bits, said second group of bits comprising address bits, and said third group of bits comprising data bits each comprise 16 bits of information.

8. The system of claim 7 wherein a portion of said second group of bits comprising address bits selects at least a one byte address location for at least one corresponding byte of data.

9. In a computer system having timed shared use of buses to reduce the number of required pins for devices within said computer system, comprising, in combination:

CPU means located on a CPU bus controller chip having at least one CPU control bus, at least one address bus, and at least one data bus for sending and receiving information;

multiplex system controller means residing in said chip and coupled to each of said CPU control bus, said address bus, and said data bus for time sharing said address bus in order to sequentially transfer groups of at least address and data information and having multiplex control bus means coupled to both memory input/output means and input/output only means for taking control of said address bus comprising, in combination:

state machine means coupled to said multiplex control bus means and to said CPU control bus for controlling said multiplex system controller means;

address latch means coupled to said state machine means and to said address bus for temporarily storing address information; and a plurality of multiplexer means each coupled to said address latch means, said data bus, and to said state machine means for transferring data to said data bus and to said address bus in response to control signals from said state machine;

CPU bus slave means coupling each of said CPU control bus, said address bus, and said data bus to said multiplex system controller means for coordinating data flow on each of said CPU control bus, said address bus, and said data bus;

at least one memory input/output means coupled to a first portion of said address bus for sending and receiving at least one of address and data information; and at least one input/output only means coupled to a second portion of said address bus for sending and receiving at least one of address and data information.

10. The system of claim 9 wherein said CPU control bus provides memory input/output signals to both said memory input/output means and said input/output only means.

11. The system of claim 9 wherein said state machine means is provided with priority signal means for interrupting a multiplex bus cycle.

12. The system of claim 9 wherein said multiplex system controller means takes temporary control of said address bus from said CPU means to send a first group of bits comprising address bits, a second group of bits comprising address bits, and a third group of bits comprising data bits to said memory input/output means.

13. The system of claim 12 wherein said multiplex system controller means takes temporary control of said address bus from said CPU means to send a first group of bits comprising address bits, a second group of bits comprising address bits, and a third group of bits comprising data bits to said input/output only means.

14. The system of claim 13 wherein said first group of bits comprising address bits, said second group of bits comprising address bits, and said third group of bits comprising data bits each comprise 16 bits of information.

15. The system of claim 14 wherein a portion of said second group of bits comprising address bits selects at least a one byte address location for at least one corresponding byte of data.

* * * * *